Dec. 26, 1950     D. FIRTH     2,535,729
MOUNTING FOR SHEAVES, ETC
Filed Jan. 23, 1946
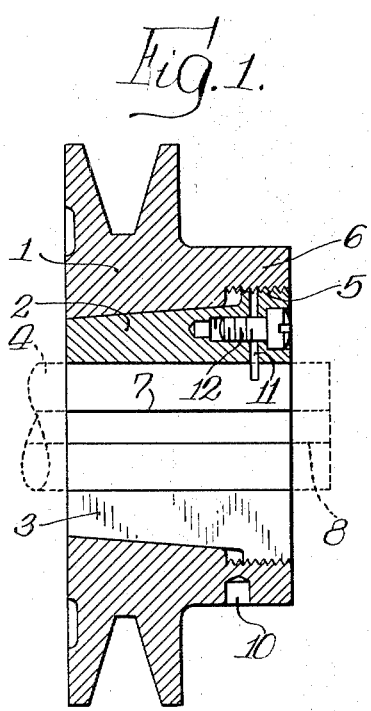
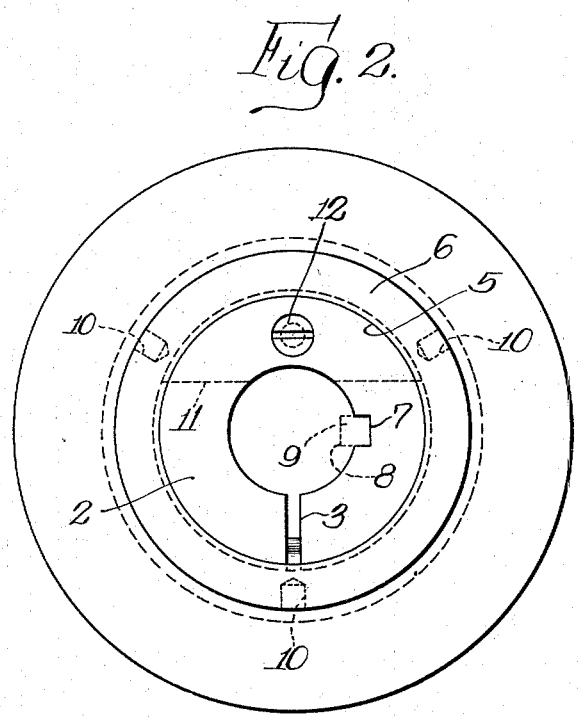
INVENTOR.
David Firth,
BY
Osgood H. Dowell
Atty.

Patented Dec. 26, 1950

2,535,729

UNITED STATES PATENT OFFICE 2,535,729

MOUNTING FOR SHEAVES, ETC.

David Firth, South Bend, Ind., assignor to Dodge Manufacturing Corporation, Mishawaka, Ind., a corporation of Indiana Application January 23, 1946, Serial No. 642,818

2 Claims. (Cl. 287—52.06)

The object of this invention is to provide a sheave or other machine element with practicable means for the mounting thereof on the shaft to which it is to be applied.

The invention will be described with reference to the accompanying drawings and will be more particularly pointed out in the claims.

In the drawings:

Fig. 1 is a longitudinal section of a sheave having mounting means embodying the invention and including in this instance an auxiliary feature of advantage.

Fig. 2 is a front end elevation of the device of Fig. 1.

The illustrative device comprises a sheave having a tapered hub bore in which fits a tapered split contractible bushing adapted to be wedged between the sheave and a shaft for securing the hub in erect position on the shaft by a tight press fit of the interfitted parts.

In the drawings, the sheave hub and bushing are designated respectively by the numerals 1 and 2. The bushing split is indicated at 3. The bushing is bored to fit the shaft to which the sheave is to be applied, such a shaft being indicated in dotted lines and designated by the numeral 4 in Fig. 1. The bushing is formed on its larger end with a radially projecting flange having a screw thread 5 of uniform diameter. This flange is received in a hub recess from which the tapered hub bore extends, said recess having a screw-threaded wall the thread of which matches and is engaged by that of said flange. The end portion of the hub containing said threaded recess and bushing flange screwed thereinto is designated in the drawings by the numeral 6. The proportions of the parts are such that the bushing inserted endwise into the hub must be screwed thereinto to obtain a close fit of the tapered bushing in the tapered hub bore, and can then be further screwed up tightly for contracting the bushing and wedging it tightly between the hub and shaft. As shown in Fig. 1, a substantial clearance is provided between the screw-threaded bushing flange and the inner end of the hub recess into which it is screwed, when the tapered stem of the bushing fits in the hub in close contact with its interior tapered surface, so as to permit such further tight screwing up of the bushing. A tight wedging of the bushing between the hub and shaft can therefore be accomplished by relative rotation movement of the hub and bushing in the proper direction for that purpose. By a relative rotative movement of the hub and bushing in the opposite direction, the bushing can be dewedged.

The bushing 2 may be keyed to the shaft either by a fixed shaft key slidably fitting an interior keyway 7 in the bushing, or by a key driven with a tight fit into said keyway 7 and mating keyway 8 in the shaft, such a key being indicated partially in dotted lines at 9 in Fig. 2.

The sheave having the bushing assembled therewith but in uncontracted state can be easily installed as a unit by slipping it on the shaft with the keyway 7 in alignment with and slidably engaging a fixed shaft key, or by slipping the unit on the shaft and inserting a key such as 9 into the keyways therefor, and then screwforcing the hub and bushing to axial relationship to wedge the bushing by turning or rotating the sheave relative to the shaft in the proper direction for that purpose. A large diameter sheave having the invention applied thereto could be grasped by hand and turned as required for wedging the bushing. In case of a small sheave such as shown, or one of such moderate size that turning it by pulling on its rim would be difficult, the hub of the sheave should be provided with suitable means by which it can be engaged and rotated by an appropriate tool. For example, the sheave hub may be provided with holes 10 for engagement by a spanner wrench, or with one or more holes in which to fit a rod or bar to be used as a lever, for turning the sheave relative to the shaft. Were the shaft key 9 not employed, the bushing 2 could be provided with suitable holes for engagement by a spanner wrench for holding it while rotating the sheave relative thereto.

An advantage of the device is that it need not be tightened very much by a wrench, since the driving torque or belt pull when the sheave is in use for power transmission may be utilized to obtain a tight wedging of the bushing. Obviously if the shaft is rotated in the direction to effect a screwing up action, the higher the torque or belt pull the tighter the bushing will be wedged. In this connection, the interengaging screw threads of the hub and bushing may be either right or left handed, and the unit comprising the sheave and bushing may be installed with either end forward, so as to avail of the driving torque for a screwing up action.

For demounting the sheave, it must be turned by wrench means or otherwise in a direction for unscrewing the hub from the bushing, so as to dewedge or release the bushing from tight gripping engagement with the shaft. After a sufficient unscrewing action for that purpose, the sheave with the bushing therein may be removed as a unit from the shaft.

If when the sheave is in service the direction of driving should be reversed, the bushing might loosen; however it has been found that a thoroughly tightened bushing may drive in either direction unless subjected to severe shock. In this connection, the angle of taper of the bushing, i. e. the included angle between diametrically opposite longitudinal contour lines thereof, is a factor. For effective wedging, the angle of taper of the bushing should not exceed about thirteen degrees. The less the angle of taper, the tighter the bushing can be wedged, but the more difficult it becomes to loosen or dewedge it. To obtain tight wedging without rendering it unduly difficult to dewedge, it is preferable to employ a bushing having an angle of taper of about from seven to nine degrees. Such a bushing, after it has once become thoroughly tightly wedged, would remain so under many conditions of service, notwithstanding reversals of the direction of driving, and could be dewedged only by a forced unscrewing action greater than the driving torque or shock imposed by a reversal of the direction of driving. This is also true to a lesser extent of a bushing having an angle of taper of even as much as twelve or thirteen degrees.

As an auxiliary feature of the invention, to permit use of the device under conditions in which a reversal of the direction of driving would likely cause an unscrewing action, or to prevent accidental dewedging in case of a greater angle of taper of the bushing than eight or nine degrees, a means is provided to secure the hub against rotative movement relative to the bushing after the latter has been wedged. For this purpose, the screw-threaded portion 5 of the bushing 2 is partially split by a deep transverse slot 11, and the parts of the bushing at opposite sides of said slot are connected by a screw 12 by tightening of which said parts can be drawn one toward the other, whereby to secure the hub against movement relative to the bushing by a gripping of the sides of the female thread of 5 by the thread on the screw 5.

While the invention is shown applied to a small single groove V-belt sheave, it will be understood that this is merely exemplary. The invention may be applied to both multiple and single belt sheaves, of large as well as small sizes, and to pulleys, sprockets, gears and various other machine elements to be mounted on shafts.

Advantages of the invention include not only the simplicity of construction which it affords but also the simplicity of operations required for the wedging and dewedging functions, as well as utilization of the driving torque to effect tight wedging; and applicability of the invention to small sheaves and to sheaves or other machine elements of relatively small diameters for use on shafts of relatively large diameters. It will be observed that the invention allows enclosure of the bushing and screw means entirely within the hub, avoiding any cumbersome protrusion on either end for anchorage or attachment of screw means, and imposes no limitations on permissible minimum radial thicknesses of the hub and bushing, except as may be required for strength or particular design.

As in other patent specifications in the art to which this invention relates, the term "shaft-mountable unit" is adapted herein to denote a sheave or other machine element having means for the mounting thereof on the shaft to which it is applied. In the claims, the term "hub" may denote the hub of a machine element or device to be mounted on a shaft or such element as a whole having a tapered hub bore.

I claim:

1. A shaft-mountable unit comprising a hub having a tapered bore and a tapered split contractible bushing fitting therein and bored to fit a shaft and adapted to be keyed to the shaft, said bushing having formed on its larger end a radially extending screw-threaded flange the thread of which is of uniform diameter, and said hub having in its corresponding end a circular recess for said flange, from which recess the tapered hub bore extends, said recess having a screw-threaded wall the thread of which matches and is engaged by that of said flange the bushing being a resilient one-piece sleeve split for its entire length by a longitudinal slot which extends through and splits said flange, the proportions of the parts being such that the bushing must be screwed into the hub to obtain a close fit thereof in the tapered hub bore and can then be further screwed up by rotating the hub to contract the bushing and wedge it tightly between the hub and shaft, the bushing being dewedgeable by rotating the hub relative thereto in a reverse direction to that for screwing up the bushing.

2. An element for a unit of the class described comprising a tapered split contractible bushing having an internal longitudinal keyway and having formed on its larger end a radially extending screw-threaded flange the thread of which is of uniform diameter, said bushing being a resilient one-piece sleeve split for its entire length by a longitudinal slot which extends through and splits said flange.

DAVID FIRTH.

REFERENCES CITED

The following references are of record in the file of this patent:

UNITED STATES PATENTS

| Number | Name | Date |
|---|---|---|
| 189,190 | Chapman | Apr. 3, 1877 |
| 470,953 | Scholfield | Mar. 15, 1892 |
| 532,827 | Schulz | Jan. 22, 1895 |
| 666,291 | Wardwell | Jan. 22, 1901 |
| 726,336 | Ott | Apr. 28, 1903 |
| 738,445 | Hoffmann | Sept. 8, 1903 |
| 746,466 | Cornell | Dec. 8, 1903 |
| 847,882 | Beach | Mar. 19, 1907 |
| 904,341 | Lindstrom | Nov. 17, 1908 |
| 1,009,729 | Ekeberg et al. | Nov. 28, 1911 |
| 1,421,100 | Roy | June 27, 1922 |
| 2,228,282 | Miller | Jan. 14, 1941 |